(12) United States Patent
Akiyama et al.

(10) Patent No.: US 9,154,181 B2
(45) Date of Patent: *Oct. 6, 2015

(54) SATELLITE SIGNAL RECEIVING DEVICE AND ELECTRONIC DEVICE

(71) Applicant: Seiko Epson Corporation, Tokyo (JP)

(72) Inventors: Toshikazu Akiyama, Matsumoto (JP); Katsuyuki Honda, Miyada-mura (JP); Norimitsu Baba, Shiojiri (JP); Jun Matsuzaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,610

(22) Filed: Dec. 22, 2014

(65) Prior Publication Data

US 2015/0103871 A1    Apr. 16, 2015

Related U.S. Application Data

(63) Continuation of application No. 13/594,228, filed on Aug. 24, 2012, now Pat. No. 8,953,999.

(30) Foreign Application Priority Data

Aug. 30, 2011    (JP) .................................. 2011-187592

(51) Int. Cl.
*H04H 20/74* (2008.01)
*H04B 1/7073* (2011.01)
*G04R 20/02* (2013.01)
*G01S 19/14* (2010.01)
*G01S 19/34* (2010.01)
(Continued)

(52) U.S. Cl.
CPC .............. *H04B 1/7073* (2013.01); *G01S 19/14* (2013.01); *G01S 19/34* (2013.01); *G04C 10/04* (2013.01); *G04R 20/02* (2013.01); *G04R 20/04* (2013.01)

(58) Field of Classification Search
CPC ................................. G01S 19/32; G04R 20/06
USPC ........... 455/3.02, 41.1, 171.1, 181.1, 427, 98; 368/47
See application file for complete search history.

(56) References Cited

U.S. PATENT DOCUMENTS

| 5,297,120 A | 3/1994 | Yuzuki et al. |
| 6,552,681 B1 | 4/2003 | Hayward et al. |
| 7,457,203 B2 | 11/2008 | Nakagawa |

(Continued)

FOREIGN PATENT DOCUMENTS

| EP | 1168114 A2 | 1/2002 |
| EP | 1349022 A2 | 10/2003 |

(Continued)

*Primary Examiner* — Eugene Yun

(57) ABSTRACT

A satellite signal reception device can reliably execute a satellite signal reception process. The satellite signal reception device has a reception time setting unit 71 that sets a reception time; a timekeeping unit that keeps internal time; and a scheduled reception control unit 72 that executes a time-based reception process that operates the reception unit when the time kept by the timekeeping unit reaches the reception time. By having a scheduled reception control unit 72, the reception process can be executed when the internal time goes to the reception time set by the reception time setting unit 71. The reception process is therefore executed once a day. The satellite signal reception process can therefore be executed reliably without being affected by how the device is used, the season, weather, or other factors.

18 Claims, 11 Drawing Sheets

(51) Int. Cl.
  *G04R 20/04* (2013.01)
  *G04C 10/04* (2006.01)

(56) References Cited

U.S. PATENT DOCUMENTS

| | | | |
|---|---|---|---|
| 7,616,153 | B2 | 11/2009 | Honda et al. |
| 8,077,551 | B2 | 12/2011 | Fujisawa |
| 8,953,999 | B2 * | 2/2015 | Akiyama et al. .............. 455/3.02 |
| 2001/0050694 | A1 | 12/2001 | Iwaki et al. |
| 2003/0198140 | A1 | 10/2003 | Shimizu |
| 2003/0219039 | A1 | 11/2003 | Oguchi |
| 2009/0034372 | A1 | 2/2009 | Fujisawa |
| 2009/0129206 | A1 | 5/2009 | Baba |
| 2009/0135674 | A1 | 5/2009 | Matsuzaki |
| 2009/0160705 | A1 | 6/2009 | Matsuzaki |
| 2009/0180356 | A1 | 7/2009 | Fujisawa |
| 2010/0220555 | A1 | 9/2010 | Honda |

FOREIGN PATENT DOCUMENTS

| | | | |
|---|---|---|---|
| EP | 1349022 | A3 | 6/2004 |
| EP | 1168114 | A3 | 7/2004 |
| EP | 1669818 | A1 | 6/2006 |
| EP | 2081091 | A1 | 7/2009 |
| JP | 05-249262 | | 9/1993 |
| JP | 06-265650 | | 9/1994 |
| JP | 07-198877 | | 8/1995 |
| JP | 2001-357425 | | 12/2001 |
| JP | 2003-279673 | | 10/2003 |
| JP | 2004-003927 | | 1/2004 |
| JP | 2004-003928 | | 1/2004 |
| JP | 2004-003929 | | 1/2004 |
| JP | 2004-340705 | | 12/2004 |
| JP | 2005-062078 | | 3/2005 |
| JP | 2005-233825 | | 9/2005 |
| JP | 2006-090770 | | 4/2006 |
| JP | 2006-194697 | | 7/2006 |
| JP | 2006-349445 | | 12/2006 |
| JP | 2007-225409 | | 9/2007 |
| JP | 2008-039565 | | 2/2008 |
| JP | 2008-215973 | | 9/2008 |
| JP | 2009-128179 | | 6/2009 |
| JP | 2009-145318 | | 7/2009 |
| JP | 2009-168620 | | 7/2009 |
| JP | 2009-175030 | | 8/2009 |
| JP | 2009-180511 | | 8/2009 |
| JP | 2009-216432 | | 9/2009 |
| JP | 2010-066151 | | 3/2010 |
| JP | 2010-203856 | | 9/2010 |
| JP | 2011-163803 | | 8/2011 |

* cited by examiner

SATELLITE SIGNAL RECEIVING DEVICE AND ELECTRONIC DEVICE

CROSS-REFERENCE TO RELATED APPLICATIONS

This application is a continuation of, and claims priority under 35 U.S.C. §120 on, application Ser. No. 13/594,228, filed Aug. 24, 2012, which claims priority under 35 U.S.C. §119 on Japanese Patent application No. 2011-187592 filed Aug. 30, 2011. The content of each such related application is incorporated by reference herein in its entirety.

BACKGROUND

1. Technical Field

The present invention relates to a satellite signal receiving device that determines the current position and adjusts the time based on signals received from positioning information satellites such as GPS satellites, and to an electronic device.

2. Related Art

Electronic devices that receive satellite signals from GPS (Global Positioning System) satellites and perform positioning and time adjustment operations are known from the literature. See, for example, Japanese Unexamined Patent Appl. Pub. JP-A-2008-39565.

When the electronic device is a device, such as a wristwatch, that moves with the user, the electronic device could conceivably move to an environment where satellite signals cannot be received, such as indoors or an underground mall.

If the reception process is executed in such an environment where satellite signals cannot be received, power is wasted. Reducing current consumption and avoiding wasteful reception processes are particularly important in battery-powered electronic devices such as wristwatches to assure sufficient duration time and reduce the battery size.

JP-A-2008-39565 therefore describes providing a solar panel in the electronic device, determining if the electronic device is outdoors by comparing the power output of the solar panel with a threshold value for determining if the electronic device is indoors or outdoors, and performing the reception process if determined to be outdoors.

However, solar panel power output corresponds to the illuminance of the light incident to the solar panel. It was therefore thought that an indoor/outdoor determination could be made by obtaining the power output corresponding to the illuminance when the electronic device is outdoors during the day and the illuminance when indoors, and setting the threshold value to differentiate between these power output levels.

However, even if the electronic device is outdoors, power output may not exceed the threshold value depending on the operating conditions of the electronic device. For example, when the electronic device having the satellite signal receiving device is a wristwatch, power output may not exceed the threshold value even though the electronic device is outdoors if the solar cell is covered by a sleeve, for example. Depending upon the season or the weather, power output may also not exceed the threshold value even though the electronic device is outdoors because direct sunlight is not incident or is weak.

Because the reception process may not be executed for a long time in this situation, the internal time cannot be adjusted based on time information acquired by receiving satellite signals, and the accuracy of the displayed time may drop. Being able to reliably execute the satellite signal reception process is therefore desirable.

SUMMARY

An object of the invention is therefore to provide a satellite signal receiving device and an electronic device that can reliably execute the satellite signal reception process.

One aspect of the invention is a satellite signal reception device with a reception unit that receives satellite signals transmitted from positioning information satellites, including: a reception time setting unit that sets a reception time; a timekeeping unit that keeps internal time; and a scheduled reception control unit that executes a time-based reception process that operates the reception unit when the time kept by the timekeeping unit reaches the reception time.

By having a scheduled reception control unit, this aspect of the invention can run the reception process when the internal time reaches the reception time set by the reception time setting unit. More specifically, the reception process runs once a day at the reception time. As a result, the satellite signal reception process can be executed reliably without being affected by how the device is used, the season, or the weather such as when a solar cell is used, for example.

In a satellite signal reception device according to another aspect of the invention, the reception time setting unit preferably sets the reception time to a time when a reception process was executed and reception was successful in the past.

The reception process run at the set reception time by the scheduled reception control unit is included in these past reception processes, but when the satellite signal reception device also has a function that detects illuminance and runs the reception process according to the detected illuminance, the past reception processes could also include the illuminance-based reception process. The manual reception process that is started by the user pressing a button, for example, can also be included.

Because the reception time is set to a time when reception was successful in the past, this aspect of the invention can also increase the probability of successful reception in the scheduled reception process.

The daily schedule of the user of the satellite signal reception device is usually roughly the same everyday. More specifically, the weekday schedule of commuting students and workers is generally the same, and the likelihood is high that the satellite signal reception device will be in an environment suitable for satellite signal reception at the same time that reception was successful in the past.

Therefore, if the reception time is set to a time when reception was successful in the past, the probability of successful reception is greater than when the reception time is fixed with no relationship to past reception results.

In a satellite signal reception device according to another aspect of the invention, when the reception process fails consecutively a specific number of times at the reception time, the reception time setting unit preferably sets the reception time to a different time instead of setting the reception time to the time when the reception process failed.

Because the time of consecutive reception failures is not set as the reception time, running the reception process at a time when the probability of successful reception is low can be prevented. Wasteful reception processes can therefore be eliminated and power can be saved.

The satellite signal reception device according to another aspect of the invention further preferably also has a solar cell; an illuminance detection circuit that detects the illuminance of light incident to the solar cell; an illuminance-based reception control unit that executes an illuminance-based reception process that operates the reception unit when the illuminance detected by the illuminance detection circuit equals or exceeds a set threshold; and a manual reception control unit that executes a manual reception process that operates the reception unit when a reception command is input by the user. In this aspect of the invention, the reception time setting unit sets the reception time to the time when reception was successful in a past in the illuminance-based reception process, a time when reception was successful in the past in the time-based reception process, or a time when reception was successful in the past in the manual reception process.

This aspect of the invention can increase the probability of successful reception in the time-based reception process because the reception time is set to a time when reception was successful in the past.

More particularly, if the time when the illuminance-based reception process was successful is set as the reception time, the reception time will likely be during a time when the user is normally outdoors in an environment suited to reception, and the probability of successful reception can therefore be improved.

If the time when the time-based reception process was successful is set as the reception time, the reception time will likely be during a time when the user is normally outdoors in an environment suited to reception, and the probability of successful reception can therefore be improved.

Furthermore, when the time when the manual reception process was successful is set as the reception time, the likelihood is high that the user knowingly started the reception process when outdoors in an environment suited to reception, and the probability of successful reception can therefore be improved because the likelihood is high that the user will be outdoors in an environment suited to reception at the same time everyday if the user's daily schedule is the same.

The reception time must be set to a time when reception was successful, but because the invention can use three different types of reception processes, the probability of successful reception can be improved. More specifically, when only an illuminance-based reception process is used, the reception process cannot be executed if light cannot be detected as described in JP-A-2008-39565. When only a time-based reception process that runs the reception process at a preset time is used, reception will not succeed if the satellite signal reception device is not in an outdoor location suited to reception at that time. In addition, if only a manual reception process is used, users with insufficient understanding of the reception operation may attempt reception when indoors, and the reception process may not succeed for a long time.

The invention, however, can execute any of three different reception processes and can set the reception time if reception is successful in any process, and can therefore improve user convenience.

Further preferably, the reception time setting unit changes the reception time to the time when the reception process was successful each time a reception process executes.

If reception is successful in each of the three reception processes, or reception is successful in any two of the three reception processes, there will be plural reception success times. By changing the reception time setting between the reception success times each time the reception process executes, the time-based reception process will be executed at different times, and the probability of successful reception can be improved.

Further preferably, the reception time setting unit changes the reception time sequentially from the most recent successful reception time in the reception success times of the reception processes.

This aspect of the invention selects the reception success time set as the reception time in order from the time of the last successful reception process, that is, of the reception success times of the three reception processes, preferentially sets the time of the most recent (newest) successful reception as the reception time.

If the reception time is thus set based on the most reception success time and the user's regular schedule changes, the reception time can be easily set to a time when the user is outdoors according to the new schedule, and the probability of successful reception can be improved.

Further preferably in a satellite signal reception device according to another aspect of the invention, the reception time setting unit changes the reception time between the most recent time of successful reception selected from the time of successful reception in the illuminance-based reception process and the time of successful reception in the time-based reception process, and the most recent time of successful reception in the manual reception process.

Because the reception time is changed between the time of a successful reception in the illuminance-based reception process and the time-based reception process, and the time of successful reception in the manual reception process, the probability of successful reception can be improved compared with fixing the reception time to either one.

More specifically, because the user may start the manual reception process when not following the usual schedule, the probability of successful reception may drop if the reception time is set only to the manual reception success time.

However, if the user intentionally runs the manual reception process at a time when the user is often outdoors, the probability of successful reception at the manual reception success time can be improved even if reception fails at the reception success time of the illuminance-based reception process or time-based reception process.

The probability of successful reception can therefore be improved by switching the reception time between times when the illuminance-based reception process and time-based reception process succeeds, and times when the manual reception process succeeds.

Further preferably, reception stops for a specific time after reception succeeds; and when resuming reception after reception is stopped, the reception time setting unit sets the initial reception time to the time of the most recent successful reception selected from the time when the illuminance-based reception process succeeded at reception and the time when the time-based reception process succeeded at reception.

If reception is stopped for a specific time, such as two days, after reception succeeds, power consumption can be suppressed. If the time when either the illuminance-based reception process or time-based reception process was successful is set as the reception time when reception resumes after the delay, the reception time can be set to a time when the user is likely to be outdoors, and the probability of successful reception in the time-based reception process can be improved compared with when the reception time is set to the manual reception success time.

Further preferably in a satellite signal reception device according to another aspect of the invention, when the reception time is a time of past successful reception and the reception process fails at the reception time, the reception time setting unit sets a time offset a specific time from the reception time as a new reception time.

When the reception process fails, this aspect of the invention runs the reception process at a time offset a specific time from the time when there is a history of successful reception, and can therefore improve the probability of successful reception.

More specifically, the specific time may be desirably set to 5 minutes, 10 minutes, 30 minutes, or a 1 hours, for example. If the user normally leaves home at 7:00 for work, the reception time is set to that time, and the user leaves 10 minutes late, reception will fail because the satellite signal reception device is indoors at the reception time of 7:00. By setting the reception time for the next day 30 minutes later to 7:30, the probability of successful reception the next day can be improved.

The satellite signal reception device according to another aspect of the invention preferably also has a manual reception control unit that executes a manual reception process that operates the reception unit when a reception command is input by the user; and when the reception time is set to the time of successful reception in the manual reception process and reception process fails consecutively a specific number of times at the set reception time, the reception time setting unit sets the reception time to a different time instead of setting the reception time to the time when the reception process failed.

When the reception process fails consecutively at the manual reception success time in this aspect of the invention, that time is no longer set as the reception time and the reception process can be prevented from executing at a time when the probability of successful reception is low. Wasteful reception processes can therefore be eliminated and power can be saved. More specifically, the manual reception process is not always executed according to the user's regular schedule. For example, if the manual reception process is run while travelling or at a special event, the reception success time may be at a time when the user is not normally outdoors. In this case, the probability of reception failing if the reception process is run at this manual reception success time is therefore high, and by eliminating this time from the reception times, wasteful reception processes can be eliminated.

Further preferably in a satellite signal reception device according to another aspect of the invention, the reception time setting unit sets the reception time to a time a specific time after the last reception process.

This aspect of the invention can repeat the reception process at a regular time interval because the time-based reception process is executed at a specific time after the last reception process. By appropriately setting the length of this specific time, the frequency of reception can be increased, and the number of times reception succeeds can be increased accordingly.

A satellite signal reception device according to another aspect of the invention further preferably also has a solar cell; an illuminance detection circuit that detects the illuminance of light incident to the solar cell; and an illuminance-based reception control unit that executes an illuminance-based reception process that operates the reception unit when the illuminance detected by the illuminance detection circuit equals or exceeds a set threshold; and the scheduled reception control unit executes the time-based reception process when the illuminance-based reception process of the illuminance-based reception control unit is not executed for a preset time or more.

This aspect of the invention runs the time-based reception process only when the illuminance-based reception process is not run for a specific time or more. As a result, the illuminance-based reception process, which executes and receives signals when outdoors where the probability of successful reception is high, is executed preferentially, the time-based reception process, which could be executed when indoors, is run as an exception, wasteful reception processes can be eliminated, and power can be saved.

Another aspect of the invention is an electronic device including the satellite signal reception device described above, a time adjustment unit that acquires at least time information from a satellite signal received by the satellite signal reception device, and adjusts the time kept by the timekeeping unit based on the time information; and a time display unit that displays the internal time kept by the timekeeping unit.

This aspect of the invention has the same effect as the satellite signal reception device described above. More specifically, because the electronic device can adjust the internal time using the time information acquired from a satellite signal, the electronic device can be used as a high precision electronic timepiece.

DESCRIPTION OF EMBODIMENTS

Embodiment 1
A first preferred embodiment of the invention is described below with reference to the accompanying figures.
Structure of an Electronic Device
FIG. 1 is a plan view of an electronic timepiece 1 as an example of an electronic device with a satellite signal receiving device according to a first embodiment of the invention, and FIG. 2 is a section view of the electronic timepiece 1.

Figure 1:
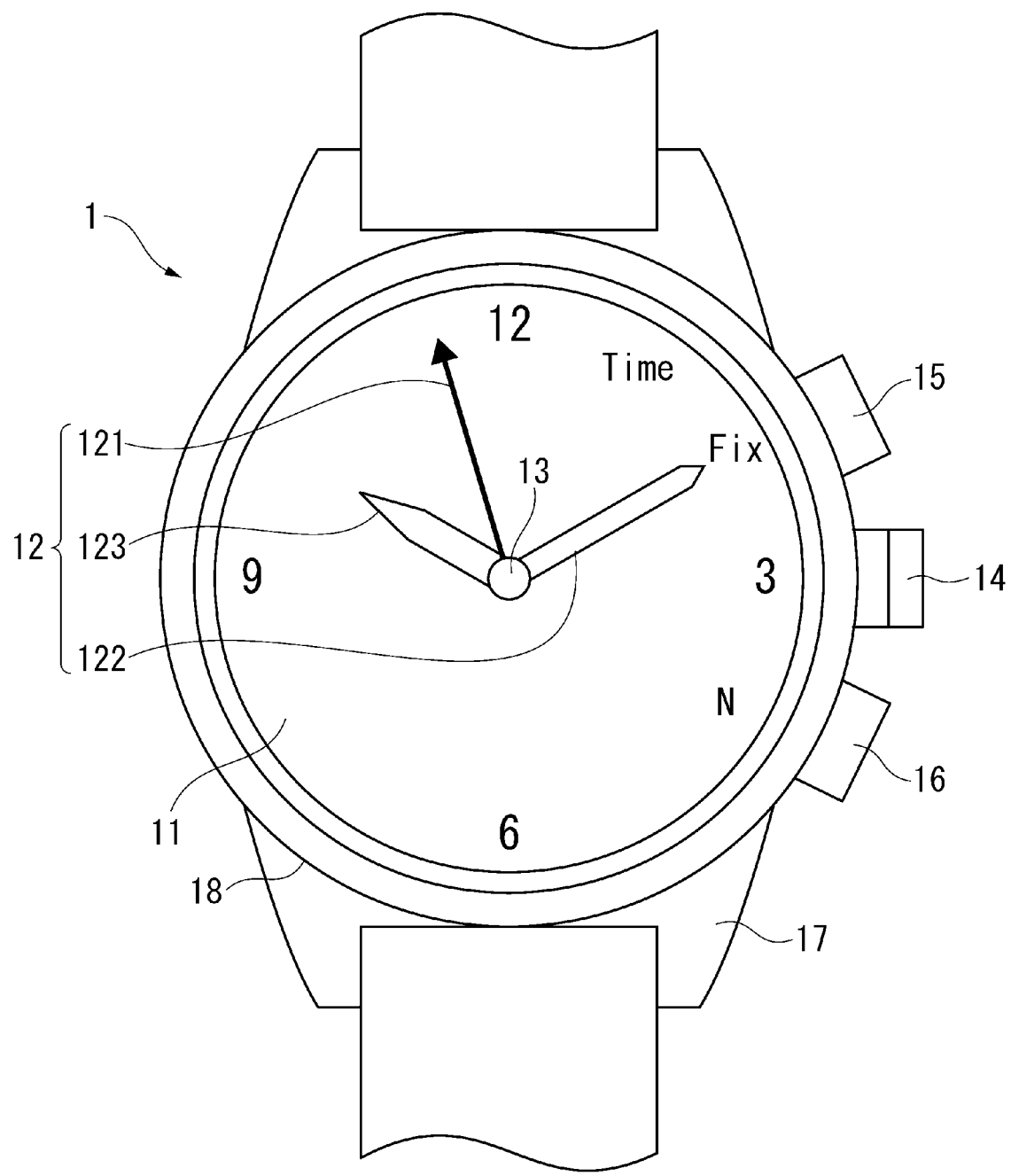
FIG. 1 is a plan view of an electronic timepiece.
Figure 2:
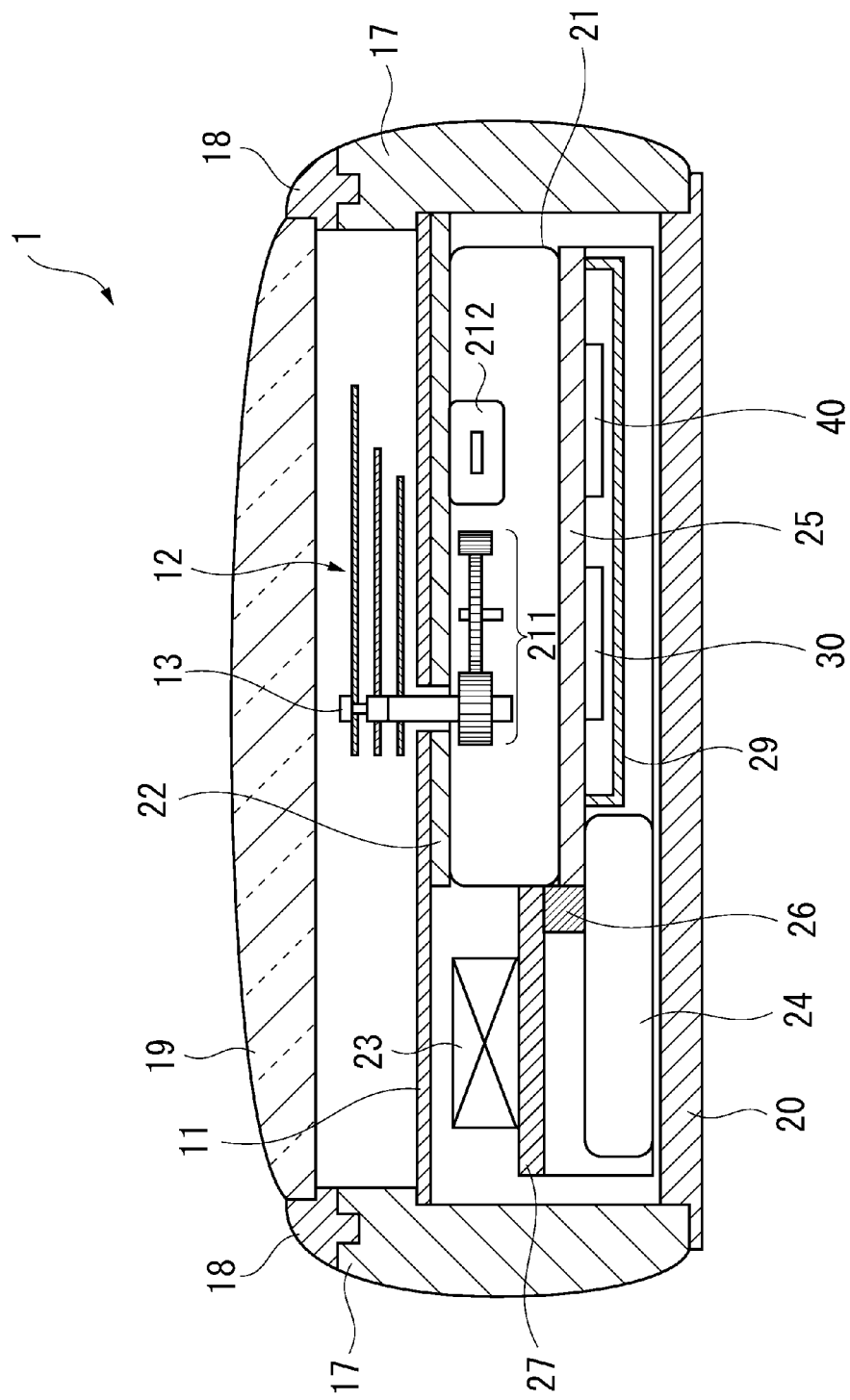
FIG. 2 is a section view of the electronic timepiece.

As will be understood from FIG. 1, the electronic timepiece 1 is a wristwatch that is worn on the user's wrist, has a dial 11 and hands 12, and keeps and displays time on the face. Most of the dial 11 is made from a non-metallic material (such as plastic or glass) through which light and microwaves in the 1.5 GHz band can pass easily. The hands 12 are disposed on the face side of the dial 11. The hands 12 include a second hand 121, minute hand 122, and hour hand 123 that rotate on a center shaft 13, and are driven by a stepper motor through an intervening wheel train.

The electronic timepiece 1 executes specific processes when the crown 14, button 15, and button 16 are manually operated. More specifically, when the crown 14 is operated, a manual adjustment process that corrects the displayed time according to how the crown 14 is operated is performed. When button 15 is depressed for an extended time (such as 3 or more seconds), a reception process for receiving satellite signals is performed.

When button 16 is pressed, a switching process for changing the reception mode (between a timekeeping mode and a positioning mode) is performed. The second hand 121 jumps to the Time position (5-second position) when the timekeeping mode is selected, and the second hand 121 jumps to the Fix position (10-second position) when the positioning mode is set.

If the button 15 is pressed for a short time, a display result process that displays the result of the previous reception process is performed. For example, the second hand 121 jumps to the Time position (the 5-second position) if reception was successful in the timekeeping mode, and the second hand 121 jumps to the Fix position (10-second position) if reception was successful in the positioning mode. If reception failed, the second hand 121 jumps to the N position (20-second position).

Note that the second hand 121 also moves to these positions during reception. More specifically, the second hand 121 moves to the Time position (the 5-second position) during reception in the timekeeping mode, and the second hand 121 moves to the Fix position (10-second position) during reception in the positioning mode. If a GPS satellite cannot be tracked, the second hand 121 moves to the N position (20-second position).

As shown in FIG. 2, the electronic timepiece 1 has an outside case 17 that is made of stainless steel, titanium, or other metal. The outside case 17 is basically cylindrically shaped. A crystal 19 is attached to the opening on the face side of the outside case 17 by an intervening bezel 18. The bezel 18 is made from a non-metallic material such as ceramic in order to improve satellite signal reception performance. A back cover 20 is attached to the opening on the back side of the outside case 17. Inside the outside case 17 are disposed a movement 21, a solar cell 22, a GPS antenna 23, and a storage battery 24.

The movement 21 includes a stepper motor and wheel train 211. The stepper motor has a motor coil 212, a stator and a rotor, and drives the hands 12 through the wheel train 211 and rotating center shaft 13.

A circuit board 25 is disposed on the back cover 20 side of the movement 21. The circuit board 25 is connected through a connector 26 to an antenna circuit board 27 and the storage battery 24.

A GPS receiver circuit 30 that processes satellite signals received through the GPS antenna 23, and a control circuit 40 that controls driving the stepper motor, for example, are mounted on the circuit board 25. The GPS receiver circuit 30 and control circuit 40 are covered by a shield plate 29, and are driven by power supplied from the storage battery 24.

The solar cell 22 is a photovoltaic device that converts light energy to electrical energy and outputs power. The solar cell 22 has an electrode for outputting the produced power, and is disposed on the back cover side of the dial 11. Most of the dial 11 is made from a material through which light passes easily, and the solar cell 22 receives and converts light passing through the crystal 19 and dial 11 to electrical power.

The storage battery 24 is the power supply for the electronic timepiece 1, and stores power produced by the solar cell 22. The two electrodes of the solar cell 22 and the two electrodes of the storage battery 24 can be electrically connected in the electronic timepiece 1, and the storage battery 24 is charged by the photovoltaic power generation of the solar cell 22 when thus electrically connected. Note that this embodiment of the invention uses a lithium ion battery, which is well suited to mobile devices, as the storage battery 24, but the invention is not so limited and lithium polymer batteries or other types of storage batteries, or a storage device other than a storage battery (such as a capacitive device), may be used instead.

The GPS antenna 23 is an antenna that can receive microwaves in the 1.5 GHz band, and is mounted on the antenna circuit board 27 located on the back cover 20 side of the dial 11. The part of the dial 11 overlapping the GPS antenna 23 in the direction perpendicular to the dial 11 is made from a material through which 1.5-GHz microwave signals pass easily (such as a non-metallic material with low conductivity and low magnetic permeability). The solar cell 22 with electrodes does not intervene between the GPS antenna 23 and the dial 11. The GPS antenna 23 can therefore receive satellite signals passing through the crystal 19 and the dial 11.

The closer the distance between the GPS antenna 23 and the solar cell 22, loss can result from electrical connection between metal components of the GPS antenna 23 and the solar cell 22, and the radiation pattern of the GPS antenna 23 may be blocked by the solar cell 22 and become smaller. The GPS antenna 23 and solar cell 22 are therefore disposed with at least a specific distance therebetween in this embodiment of the invention to prevent a drop in reception performance.

The GPS antenna 23 is also disposed with at least a specific distance to metal parts other than the solar cell 22. For example, if the outside case 17 and movement 21 contain metal parts, the GPS antenna 23 is disposed so that the distance to the outside case 17 and the distance to the movement 21 is at least this specific distance. Note that a patch antenna (microstrip antenna), helical antenna, chip antenna, or inverted F-type antenna, for example, could be used as the GPS antenna 23.

The GPS receiver circuit 30 is a load that is driven by power stored in the storage battery 24, attempts to receive satellite signals from the GPS satellites through the GPS antenna 23 each time the GPS receiver circuit 30 is driven, supplies the acquired orbit information, GPS time information, and other information to the control circuit 40 when reception succeeds, and sends a failure report to the control circuit 40 when reception fails. Note that the configuration of the GPS receiver circuit 30 is the same as the configuration of a GPS receiver circuit known from the literature, and description thereof is omitted.

The reception unit in this embodiment of the invention therefore includes a GPS antenna 23 and GPS reception circuit 30.

Figure 3:
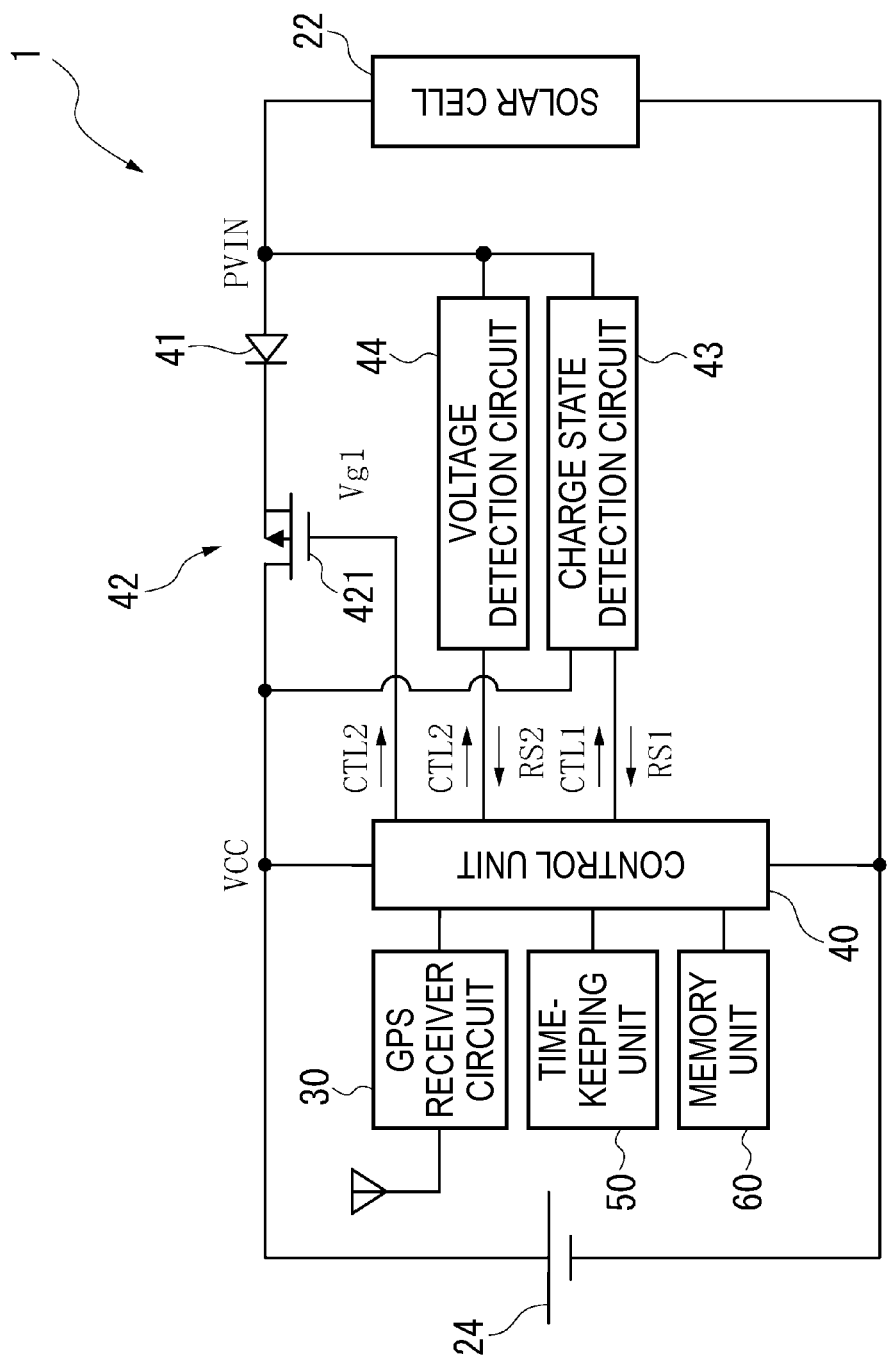
FIG. 3 is a block diagram showing the circuit configuration of the electronic timepiece.

FIG. 3 is a block diagram showing the circuit configuration of the electronic timepiece 1. As shown in this figure, the electronic timepiece 1 has a solar cell 22, storage battery 24, GPS receiver circuit 30, control circuit 40, diode 41, charging control switch 42, charge state detection circuit 43, voltage detection circuit 44, clock unit 50, and storage unit 60. Note that an illuminance detection circuit of the invention includes the charge state detection circuit 43 and voltage detection circuit 44.

The control circuit 40 includes a CPU for controlling an electronic timepiece 1 having a satellite signal receiving device. As described below, the control circuit 40 includes a reception control unit 70 that controls the GPS receiver circuit 30 and executes a reception process, and a time adjustment unit 45 that adjusts the internal time kept by the clock unit 50 using the acquired GPS time information. The control circuit 40 also controls operation of the charge state detection circuit 43 and voltage detection circuit 44.

Diode 41 is disposed to a path that electrically connects the solar cell 22 and storage battery 24, and blocks current from the storage battery 24 to the solar cell 22 (reverse current) without blocking current from the solar cell 22 to the storage battery 24 (forward current). Note that forward current flow is limited to when the solar cell 22 voltage is greater than the storage battery 24 voltage, that is, while charging. A field-effect transistor (FET) may also be used instead of a diode 41.

The charging control switch 42 closes and opens the current path from the solar cell 22 to the storage battery 24, and includes a switching device 421 disposed to a path that electrically connects the solar cell 22 and storage battery 24. The charging control switch 42 turns on (closes) when the switching device 421 switches from the off state to the on state, and turns off (opens) when the switching device 421 switches from the on state to the off state.

For example, to prevent the battery voltage of the storage battery 24 from going above a specific level so that battery characteristics do not deteriorate as a result of overcharging, the charging control switch 42 is turned off.

The switching device 421 is a p-channel transistor that turns off when the gate voltage Vg1 is LOW and turns on when HIGH. The gate voltage Vg1 is controlled by the control circuit 40.

The charge state detection circuit 43 operates based on a binary control signal CTL1 that specifies the charge state detection timing, detects the state of charging from the solar cell 22 to the storage battery 24 (the charge state), and outputs detection result RS1 to the control circuit 40. The charge state is either "charging" or "not charging", and charge state detection is based on the battery voltage VCC and PVIN from the solar cell 22 when the charging control switch 42 is ON. For example, if the voltage drop of the diode 41 is Vth and the ON resistance of the switching device 421 is ignored, "charging" can be determined when PVIN−Vth>VCC, and "not charging" can be determined when PVIN−Vth≤VCC.

In this embodiment of the invention the control signal CTL1 is a pulse signal with a 1-second period, and the charge state detection circuit 43 detects the charge state when the control signal CTL1 is HIGH. More specifically, the charge state detection circuit 43 repeatedly detects the charge state on a 1-second period while the charging control switch 42 remains closed.

Note that the charge state is detected intermittently to reduce the power consumption of the charge state detection circuit 43. If this reduction is not necessary, the charge state may be detected continuously. The charge state detection circuit 43 can be configured using a comparator or A/D converter, for example.

The voltage detection circuit 44 operates based on a binary control signal CTL2 that specifies the voltage detection timing, and detects the terminal voltage PVIN of the solar cell 22, that is, the open circuit voltage of the solar cell 22, when the charging control switch 42 is turned off by the control signal CTL2. The voltage detection circuit 44 outputs the detection result RS2 of the open circuit voltage to the control circuit 40.

Figure 4:
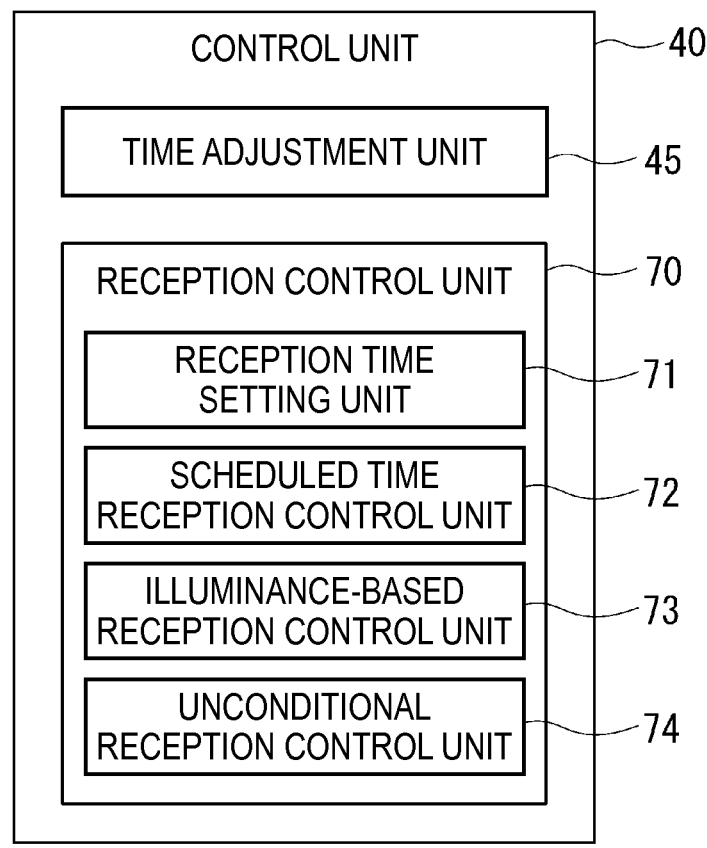
FIG. 4 is a block diagram showing the configuration of the control circuit of the electronic timepiece.

As shown in FIG. 4, the reception control unit 70 includes a reception time setting unit 71, a scheduled reception control unit 72, an illuminance-based reception control unit 73, and a manual reception control unit 74.

The reception time setting unit 71 sets the reception time for automatic reception.

The scheduled reception control unit 72 operates the GPS reception circuit 30 and runs the reception process when the internal time reaches the reception time set by the reception time setting unit 71. The reception process run by the scheduled reception control unit 72 is the time-based reception process in the accompanying claims, and is referred to below as the time-based automatic reception process.

The illuminance-based reception control unit 73 operates the GPS reception circuit 30 and runs the reception process when the open voltage (illuminance) detected by the voltage detection circuit 44 equals or exceeds a specific threshold. The reception process run by the illuminance-based reception control unit 73 is the illuminance-based reception process in the accompanying claims, and is referred to below as the illuminance-based automatic reception process.

The automatic reception processes performed by the scheduled reception control unit 72 and illuminance-based reception control unit 73 (time-based automatic reception process and illuminance-based automatic reception process) are controlled to run only once a day.

The manual reception control unit 74 operates the GPS reception circuit 30 and runs a reception process (manual reception process) when the user presses the button 15 to start reception manually.

The clock unit 50 includes the movement 21, is driven by power stored in the storage battery 24, and runs a timekeeping process. This timekeeping process both keeps the time and displays the time corresponding to the kept time (the display time) on the face of the electronic timepiece 1. The timekeeping unit that keeps the internal time in the invention is therefore embodied by the clock unit 50.

As described below, the storage unit 60 stores information including the most recent reception success time and the reception history (reception process time, reception result) in the illuminance-based automatic reception process, time-based automatic reception process, and manual reception process, and the reception time set by the reception time setting unit 71. The storage capacity of the storage unit 60 can be determined according to the number of types of information and the amount of information stored.

Description of the Reception Control Process

The reception control process in a first embodiment of the invention is described next with reference to the flow charts in FIG. 5 and FIG. 6.

Figure 5:
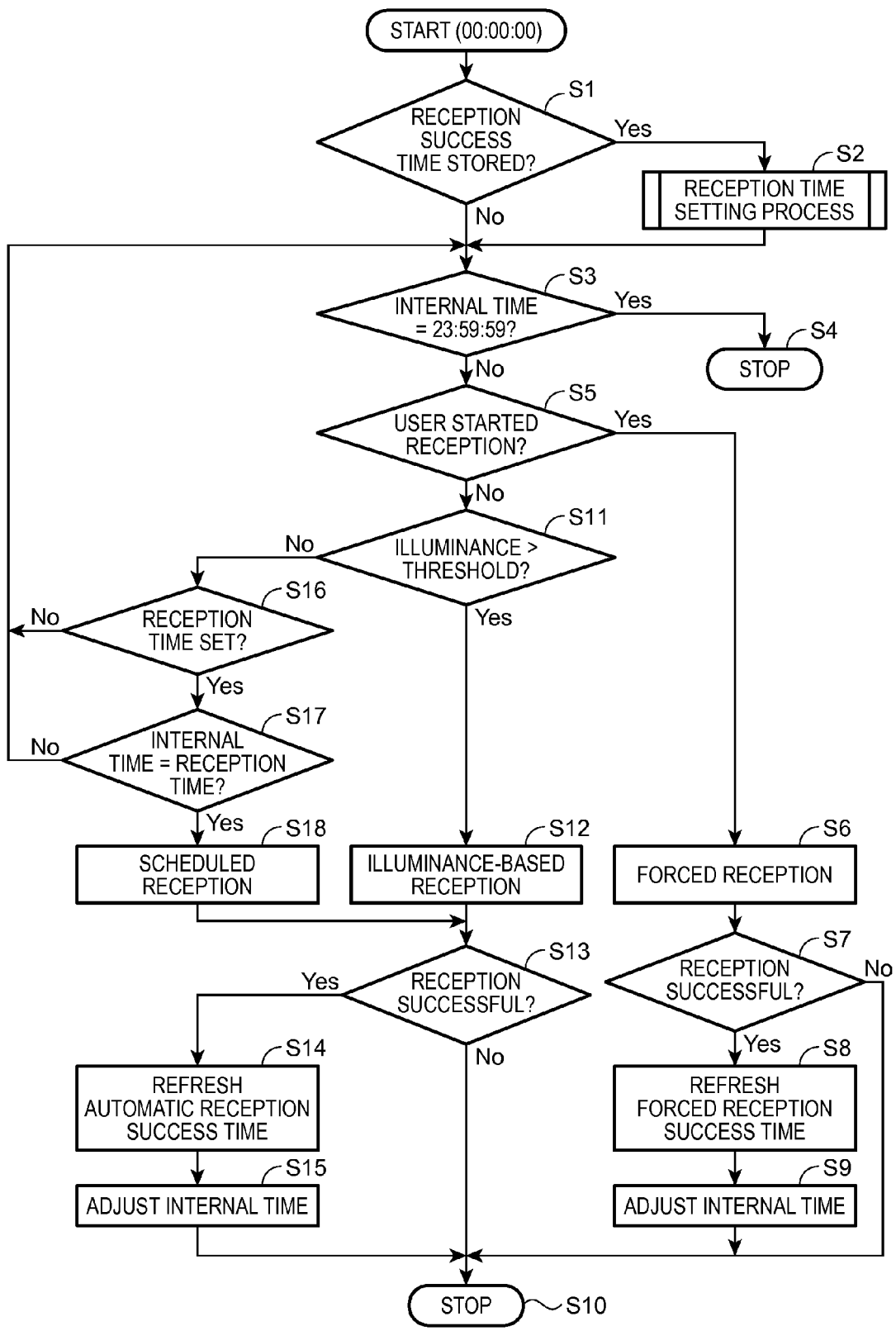
FIG. 5 is a flow chart of the reception control process in a first embodiment of the invention.

The reception control unit 70 of the control circuit 40 starts the reception control process in FIG. 5 when the internal time kept by the clock unit 50 reaches 00:00:00 (note that 24-hour time notation is used herein).

The reception control unit 70 first determines if there is a reception success time record in the storage unit 60 (S1). As further described below, there are two types of reception success times in this embodiment, the automatic reception success time and the manual reception success time, which are stored separately in the storage unit 60.

When step S1 returns Yes, the reception control unit 70 executes the reception time setting process with the reception time setting unit 71 (S2).

If a system reset occurs, the storage unit 60 is also initialized and there will be no record of a reception success time. When there is no record of a reception success time, S1 returns No.

Because the reception time has not been set if there is no record of the reception success time, the time-based automatic reception process is not run by the scheduled reception control unit 72. More specifically, the time-based automatic reception process is not run until the reception process is run by the illuminance-based reception control unit 73 or manual reception control unit 74 and reception is successful. These processes are described below.

After S1 returns No or S2 executes, the reception control unit 70 checks if the internal time has reached 23:59:59 (S3). If S3 returns Yes, the reception control process ends (S4). However, because the reception control process starts at 00:00:00, the process starts again from step S1 one second later if S3 returns Yes.

If S3 returns No and one day has not passed since the reception control process started, the reception control unit 70 determines if reception was started manually using the button 15 (S5).

Manual Reception Process

If S5 returns Yes, the manual reception control unit 74 of the reception control unit 70 operates the GPS reception circuit 30 and runs the manual reception process (S6).

The manual reception control unit 74 determines if reception was successful in the manual reception process (S7). If reception was successful, the reception time setting unit 71 updates the manual reception success time stored in the storage unit 60 to the time that manual reception succeeded (S8).

The control circuit 40 then adjusts the internal time kept by the clock unit 50 with the time information acquired from the GPS reception circuit 30 (S9). The time displayed by the hands 12 is thus adjusted to the correct time.

The reception control process in FIG. 5 then ends (S10) whether manual reception succeeds (S7 returns Yes) or fails (S7 returns No). Because power consumption by the reception process using the GPS reception circuit 30 is high, the reception process is preferably limited to once a day. As a result, when the manual reception process is run in S6, the reception control process ends for that day, and the reception process is not run again until the next day.

Illuminance-Based Automatic Reception Process

When S5 returns No, the reception control unit 70 determines if the output (open voltage) of the voltage detection circuit 44, that is, the detected illuminance, exceeds a specific threshold (S11).

If S11 returns yes, the illuminance-based reception control unit 73 of the reception control unit 70 operates the GPS reception circuit 30 and runs the illuminance-based automatic reception process (S12).

The illuminance-based reception control unit 73 then determines if the illuminance-based automatic reception process was successful (S13). If reception was successful, the reception time setting unit 71 updates the automatic reception success time stored in the storage unit 60 to the time that illuminance-based automatic reception was successful (S14).

The control circuit 40 then adjusts the internal time kept by the clock unit 50 with the time information acquired from the GPS reception circuit 30 (S15). The time displayed by the hands 12 is thus adjusted to the correct time.

As in the manual reception process, the reception control process then ends (S10) whether the illuminance-based automatic reception process succeeded (S13 returns Yes) or failed (S13 returns No). The illuminance-based automatic reception process therefore also runs only once a day.

Time-based Automatic Reception Process

If S11 returns No, the reception control unit 70 determines if there is a record of a reception time set by the reception time setting process S2 (S16). If the system was reset and the reception success time of a manual reception process or illuminance-based automatic reception process has not been recorded, the reception time setting process S2 is not executed and S16 therefore returns No. As a result, the time-based automatic reception process is not run and decision steps S3, S5, and S11 repeat.

If the reception time has been set (S16 returns Yes), the reception control unit 70 determines if the internal time kept by the clock unit 50 has reached the set reception time (S17). Because S17 returns No until the reception time is reached, control returns to decision step S3.

When S17 returns Yes, the scheduled reception control unit 72 of the reception control unit 70 operates the GPS reception circuit 30 and runs the time-based automatic reception process (S18).

Similarly to the illuminance-based reception control unit 73, the scheduled reception control unit 72 determines if reception succeeded in the time-based automatic reception process (S13). If reception was successful, the reception time setting unit 71 updates the automatic reception success time stored in the storage unit 60 to the time that time-based automatic reception was successful (S14).

The control circuit 40 then adjusts the internal time kept by the clock unit 50 with the time information acquired from the GPS reception circuit 30 (S15). The time displayed by the hands 12 is thus adjusted to the correct time.

As in the illuminance-based automatic reception process, the reception control process then ends (S10) whether the time-based automatic reception process succeeded (S13 returns Yes) or failed (S13 returns No). The time-based automatic reception process therefore also runs only once a day.

When the reception time has not been set such as after a system reset, the reception control unit 70 continues the reception control process until the manual reception process or illuminance-based automatic reception process is executed during the period of one day. When the reception time has been set, the reception control unit 70 also executes the time-based automatic reception process when the set (scheduled) time arrives. Once any reception process has executed, the reception control process stops until the next day.

When reception succeeds, the manual reception success time or automatic reception success time is updated to the time reception succeeded. Note that the time reception succeeded is usually the time that the successful reception process started, but could be the time the successful reception process ended or a time during the successful reception process.

Reception Time Setting Process

The reception time setting process of step S2 is described next with reference to FIG. 6.

If a reception success time record is found in S1, the reception control unit 70 operates the reception time setting unit 71 and runs the reception time setting process in S2.

The reception time setting unit 71 determines if reception succeeded in the previous illuminance-based automatic reception process or time-based automatic reception process (S21). More specifically, the scheduled reception control unit 72, illuminance-based reception control unit 73, and manual reception control unit 74 store a history indicating whether or not reception succeeded in the respective reception processes in the storage unit 60, and the reception time setting unit 71 checks these reception records to decide if reception was successful.

If S21 returns Yes, the reception time setting unit 71 checks the reception history to determine if the last successful reception process was a manual reception process (S22).

If S22 returns No, that is, the last successful reception process was the illuminance-based automatic reception process or time-based automatic reception process, the automatic reception success time is set as the reception time (S23).

If S22 returns Yes, that is, the last successful reception process was the manual reception process, the manual reception success time is set as the reception time (S24).

In either case, therefore, the most recent reception success time is set as the reception time.

If S21 returns No, the reception time setting unit 71 determines if the last reception process was at the automatic reception success time (S25). More specifically, if the last reception was at the automatic reception success time, the reception process was run at the reception time set to the automatic reception success time, that is, the last time reception failed was in the time-based automatic reception process.

If S25 returns Yes, the reception time setting unit 71 determines if the manual reception success time was recorded (S26). If S26 returns Yes, the reception time setting unit 71 sets the manual reception success time as the reception time (S24).

More specifically, because the time-based automatic reception process failed when the reception time was set to the automatic reception success time (S21 returns No), the time-based automatic reception process is set to run at a different time by updating the reception time to the manual reception success time.

If S26 returns No, a manual reception success time was not recorded and the reception time setting unit 71 therefore sets the automatic reception success time as the reception time (S23). In this case, the reception time remains the same.

If S25 returns No, the last reception process to fail was the time-based automatic reception process executed at the manual reception success time, or the illuminance-based automatic reception process. The reception time setting unit 71 therefore determines if there is a record of the automatic reception success time (S27).

If S27 returns Yes, the reception time setting unit 71 sets the automatic reception success time as the reception time (S23).

If S27 returns No, the reception time setting unit 71 sets the manual reception success time as the reception time (S24).

After setting the reception time as described above, the reception time setting unit 71 ends the reception time setting process S2.

Because S16 in FIG. 5 returns Yes if the reception time is set in S2, the manual reception process or illuminance-based automatic reception process is not executed after reception control starts at 00:00:00, and the time-based automatic reception process is run when the set reception time is reached.

Effect of the First Embodiment

If reception is successful in the manual reception process or illuminance-based automatic reception process after a system reset in the first embodiment, the reception time setting unit 71 sets the time of that successful reception process as the reception time, and the scheduled reception control unit 72 executes the reception process at the set reception time. As a result, the scheduled reception control unit 72 can reliably execute the reception process once a day even if the illuminance-based reception control unit 73 does not operate when the user is outdoors because the electronic timepiece 1 is covered by clothing. Being unable to receive a satellite signal for a long time and the accuracy of the displayed time dropping can therefore be prevented.

Furthermore, because the reception time is the time of a past successful reception process, the probability of reception succeeding in the time-based automatic reception process can be improved. More specifically, because the scheduled reception control unit 72 runs the reception process without checking if the reception environment is actually good, the probability of reception failing is high when the reception time is preset. However, by setting the reception time to the time of a past successful reception process, the likelihood that the reception time will be set to a time during the user's daily schedule when the user is outdoors is also high in this embodiment of the invention. The probability of successful reception in the time-based automatic reception process can therefore be increased.

When both an automatic reception success time and manual reception success time are recorded, the reception time setting unit 71 sets the most recent reception success time as the reception time. As a result, the probability that the reception time can be set to a time in the user's most recent schedule of activity when the user is outdoors can be increased when the user's daily schedule changes, and the probability of successful reception in the time-based automatic reception process can be increased accordingly.

When only one of the automatic reception success time and manual reception success time is recorded, the reception time setting unit 71 can set that reception success time as the reception time. The reception time can therefore be set if either the illuminance-based automatic reception process or manual reception process succeeds, and the time-based automatic reception process can be run starting the next day. The user therefore does not need to perform a special operation to set the reception time, and usability can be improved.

Embodiment 2

A second embodiment of the invention is described next with reference to FIG. 7 and FIG. 8.

Note that the second embodiment differs from the first embodiment in the content of the reception control process, the construction of the electronic timepiece 1 and the satellite signal reception process of the control circuit are the same as in the first embodiment, and further detailed description thereof is thus simplified or omitted below.

Figure 6:
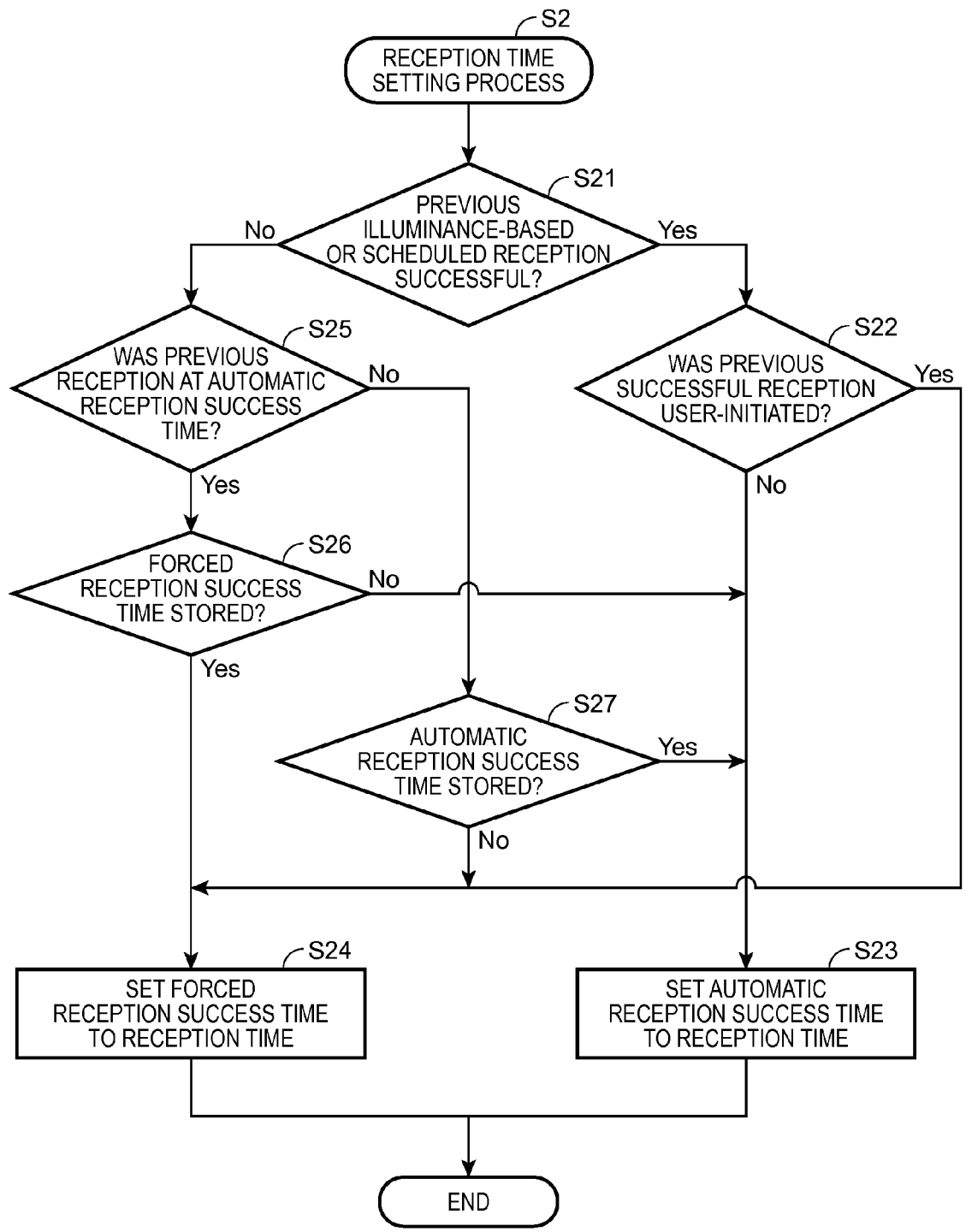
FIG. 6 is a flow chart of the reception time setting process in a first embodiment of the invention.
Figure 7:
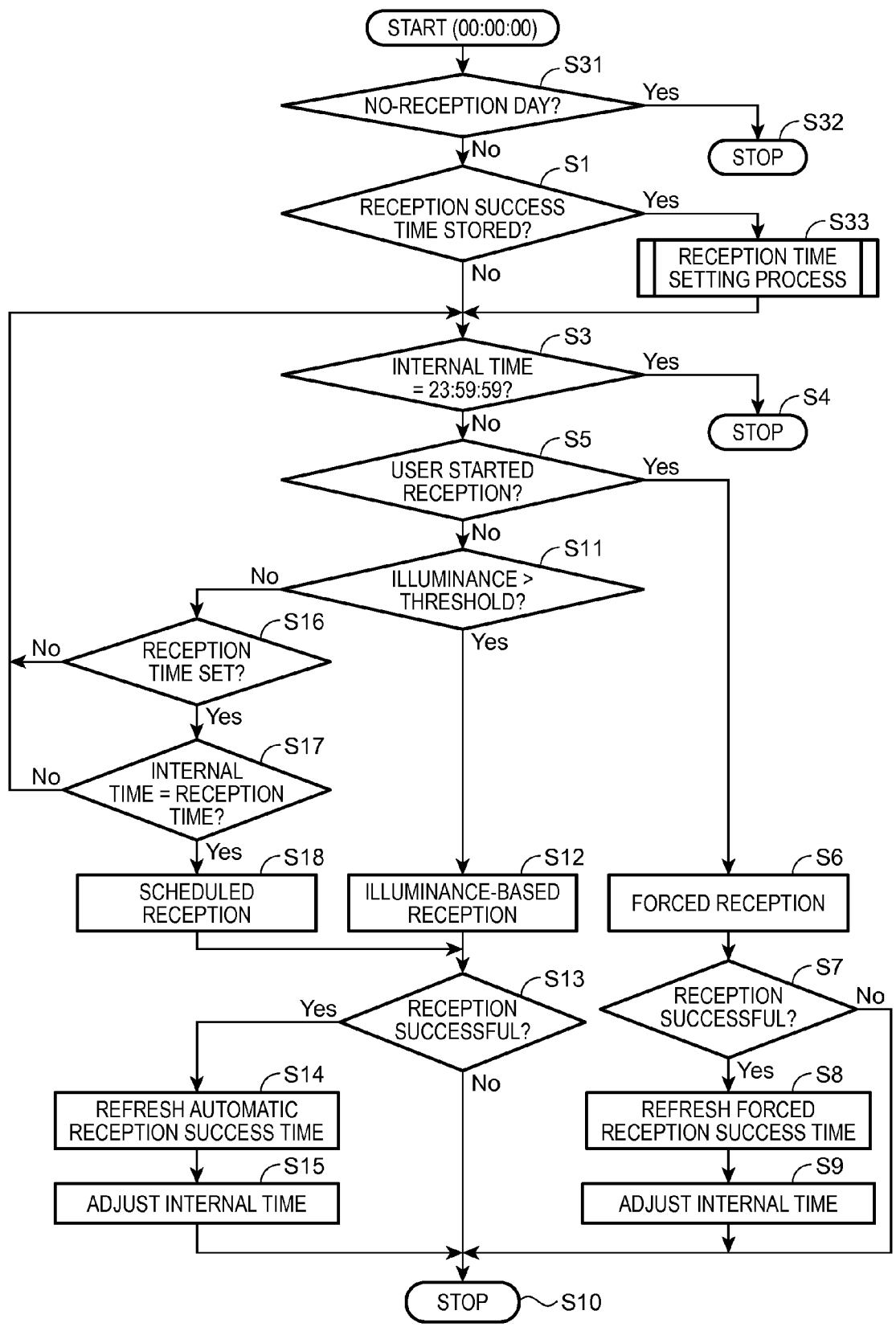
FIG. 7 is a flow chart of the reception control process in a second embodiment of the invention.
Figure 8:
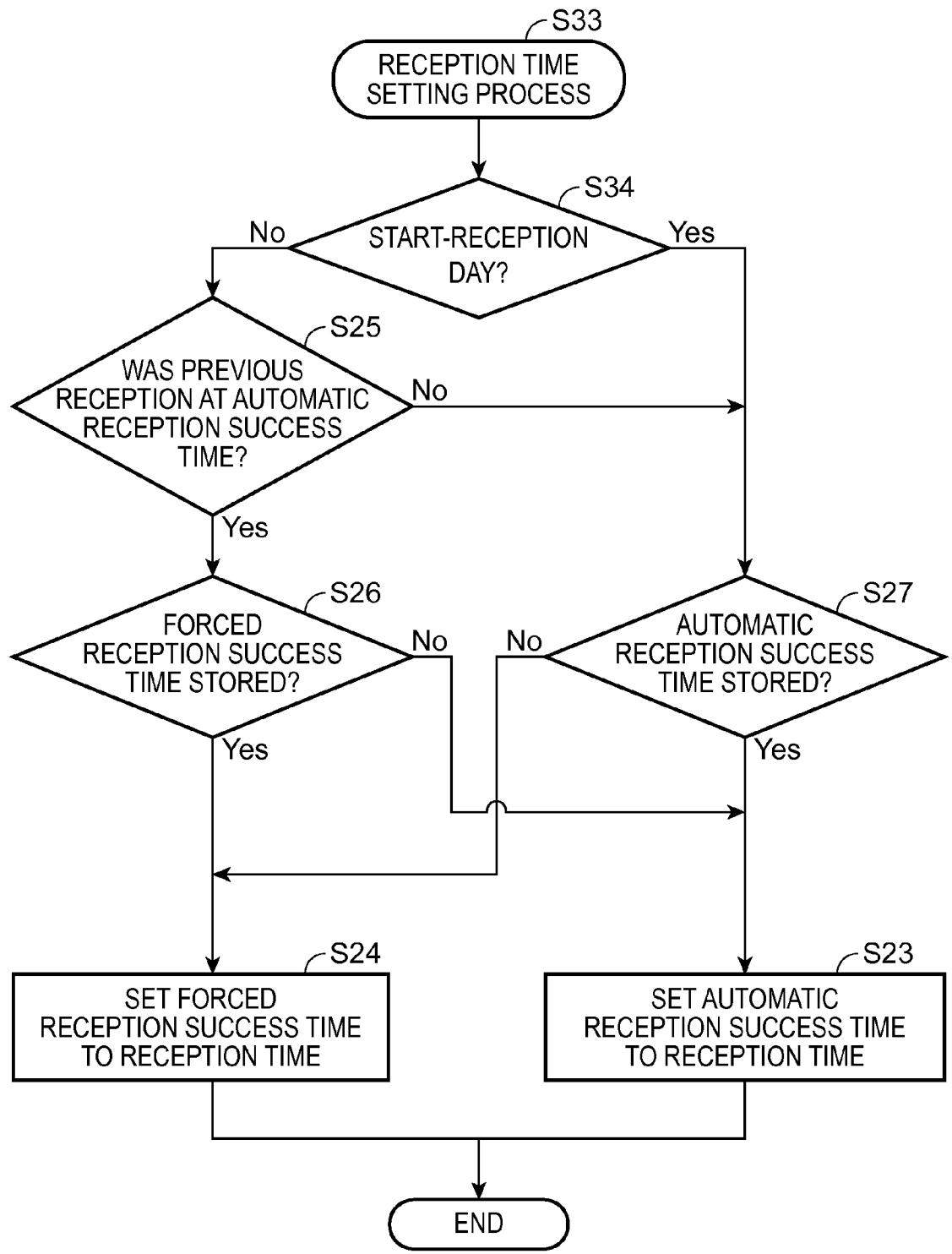
FIG. 8 is a flow chart of the reception time setting process in a second embodiment of the invention.

Identical steps in the flow charts in FIG. 7 and FIG. 8 and the flowcharts in FIG. 5 and FIG. 6 are identified by the same reference numerals, and further description thereof is omitted.

In the second embodiment as shown in FIG. 7, the reception control unit 70 first determines when the reception control process starts at 00:00 if the current date is a no-reception day (S31). More specifically, the reception control unit 70 checks the reception history stored in the storage unit 60, and if reception was successful the previous day, pauses reception for two days from the next day. Therefore, if reception was successful yesterday or the day before, the reception control unit 70 determines the current date is a no-reception day.

If S31 returns Yes, the reception control unit 70 ends the reception control process for that day.

However, if S31 returns No, the reception control unit 70 goes to step S1, and runs the reception time setting process if a reception success time record is found (S33).

Operation after the reception time is set in S33, and in steps S3 to S18 when S1 returns No, is the same as described in the first embodiment, and further description thereof is omitted.

Reception Time Setting Process

The reception time setting process S33 in the second embodiment is described next with reference to FIG. 8. The same steps in FIG. 8 and the reception time setting process S2 shown in FIG. 6 are identified by the same reference numerals and further description thereof is omitted.

When the reception time setting process S33 is executed, the reception time setting unit 71 determines if the current date is the start reception day (S34). The start reception day is the day that reception resumes after reception is delayed for the no-reception days, and more specifically is the day after reception is delayed for two days after reception succeeds.

If reception was delayed yesterday and the day before and today is the start reception day, the reception time setting unit 71 returns Yes in S34. In this case, the reception time setting unit 71 checks if there is an automatic reception success time record (S27), and if there is sets the automatic reception success time as the reception time (S23).

If S27 returns No, there is no automatic reception success time record, and the reception time setting unit 71 sets the manual reception success time as the reception time (S24).

If S34 returns No, the reception process was run on a day that is not the start reception day. More specifically, because reception is not delayed and reception is attempted every day if reception fails, the reception process is executed on a day that is not the start reception day. As when the reception time setting unit 71 determines No in S21 in the first embodiment, the reception time setting unit 71 therefore determines if the previous reception process was run at the automatic reception success time (S25).

If S25 returns Yes, the reception time setting unit 71 determines if the manual reception success time was recorded (S26). If S26 returns Yes, the reception time setting unit 71 sets the manual reception success time as the reception time (S24).

If S26 returns No, the reception time setting unit 71 sets the automatic reception success time as the reception time (S23).

If S25 returns No, the reception time setting unit 71 determines if there is a record of the automatic reception success time (S27), and sets the reception time in S23 or S24 based on the result as described above.

After setting the reception time as described above, the reception time setting unit 71 ends the reception time setting process S33.

Because S16 in FIG. 7 returns Yes if the reception time is set in S33, the manual reception process or illuminance-based automatic reception process is not executed after reception control starts at 00:00:00, and the time-based automatic reception process is run when the set reception time is reached.

Effect of the Second Embodiment

The second embodiment has the same effect as the first embodiment.

In addition, the second embodiment can reduce how frequently the reception process is performed and can therefore save energy by pausing reception for two days after reception is successful. Note that because the precision of the internal time of the clock unit 50 is the same as the precision of a quartz timepiece, the accuracy of the displayed time can be kept to a level that poses no problem for practical use even if reception does not occur for a few days.

The reception time setting unit 71 also preferentially sets the automatic reception success time as the reception time for the time-based automatic reception process on the start reception day after the reception delay period. As a result, the reception time can be preferentially set to a time when the user's schedule means that the user will likely be outdoors, and the probability of successful reception in the following time-based automatic reception process can therefore be improved compared with setting the reception time to the manual reception success time.

Embodiment 3

A third embodiment of the invention is described next with reference to FIG. 9.

Note that the third embodiment differs from the first embodiment in the process when reception fails in the time-based automatic reception process S18. Other aspects of this embodiment are the same as in the first embodiment, and further detailed description thereof is thus simplified or omitted below.

Figure 9:
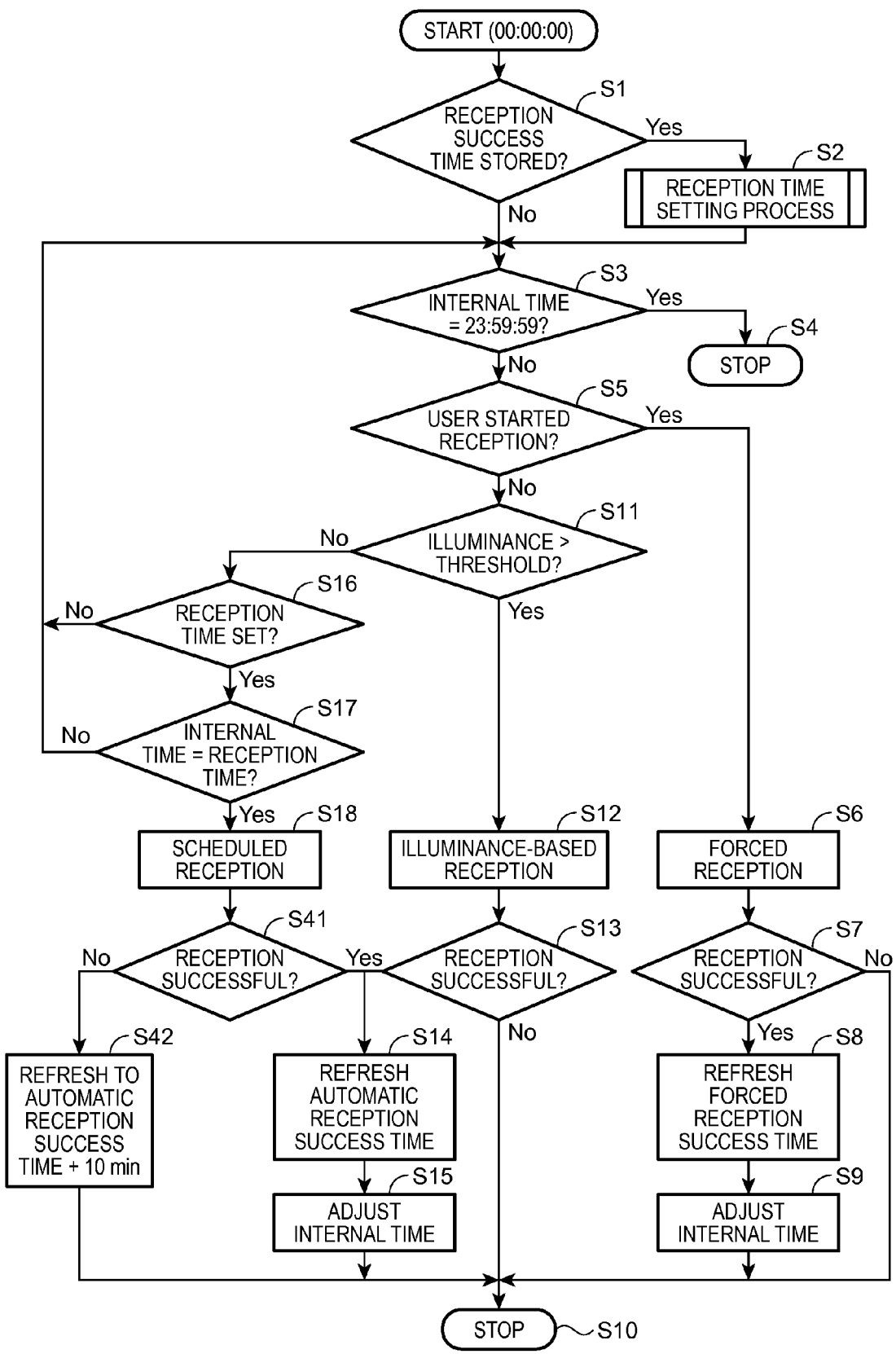
FIG. 9 is a flow chart of the reception control process in a third embodiment of the invention.

Identical steps in the flow chart in FIG. 9 and the flow chart in FIG. 5 of the first embodiment are identified by the same reference numerals, and further description thereof is omitted.

In the third embodiment as shown in FIG. 9, steps S1 to S18 are the same as in the first embodiment. The reception time setting process S2 is therefore also the same as in the first embodiment.

After the time-based automatic reception process S18, the scheduled reception control unit 72 determines if reception was successful (S41).

If reception was determined successful in S41, the automatic reception success time is updated as in the first embodiment (S14) and the internal time is adjusted (S15).

However, if reception was determined to have failed in S41, the automatic reception success time stored in storage unit 60 is updated by adding 10 minutes to the stored time (S42).

As a result, when the reception time is set to the automatic reception success time in the next reception time setting process S2, a time 10 minutes later than the current time when reception failed will be set.

Note that the added time is not limited to +10 minutes, and could be +30 minutes, −20 minutes, −40 minutes, or other desirable time. Further alternatively, plural times could be prepared as the amount of added time, and the amount of time added could be changed each time reception fails in S41.

Effect of Embodiment 3

This third embodiment has the same effect as the first embodiment.

In addition, because a specific amount of time is added to the automatic reception success time to change and update the stored automatic reception success time when reception fails in the time-based automatic reception process, the next reception time can be set to the time obtained by adding this time. Therefore, because the time-based automatic reception process is executed at a time close to the time when there is a history of successful reception, the probability of successful reception can be improved when the user leaves home at a slightly different time than usual, for example.

Embodiment 4

A fourth embodiment of the invention is described next with reference to FIG. 10 and FIG. 11.

This fourth embodiment differs from the first embodiment in that when the time-based automatic reception process fails at the reception time set to the manual reception success time, the number of manual reception failures is counted, and when this count exceeds a specific threshold, running the time-based automatic reception process at the manual reception success time stops.

Other aspects of this embodiment are the same as in the first embodiment, and further detailed description thereof is thus simplified or omitted below.

Figure 10:
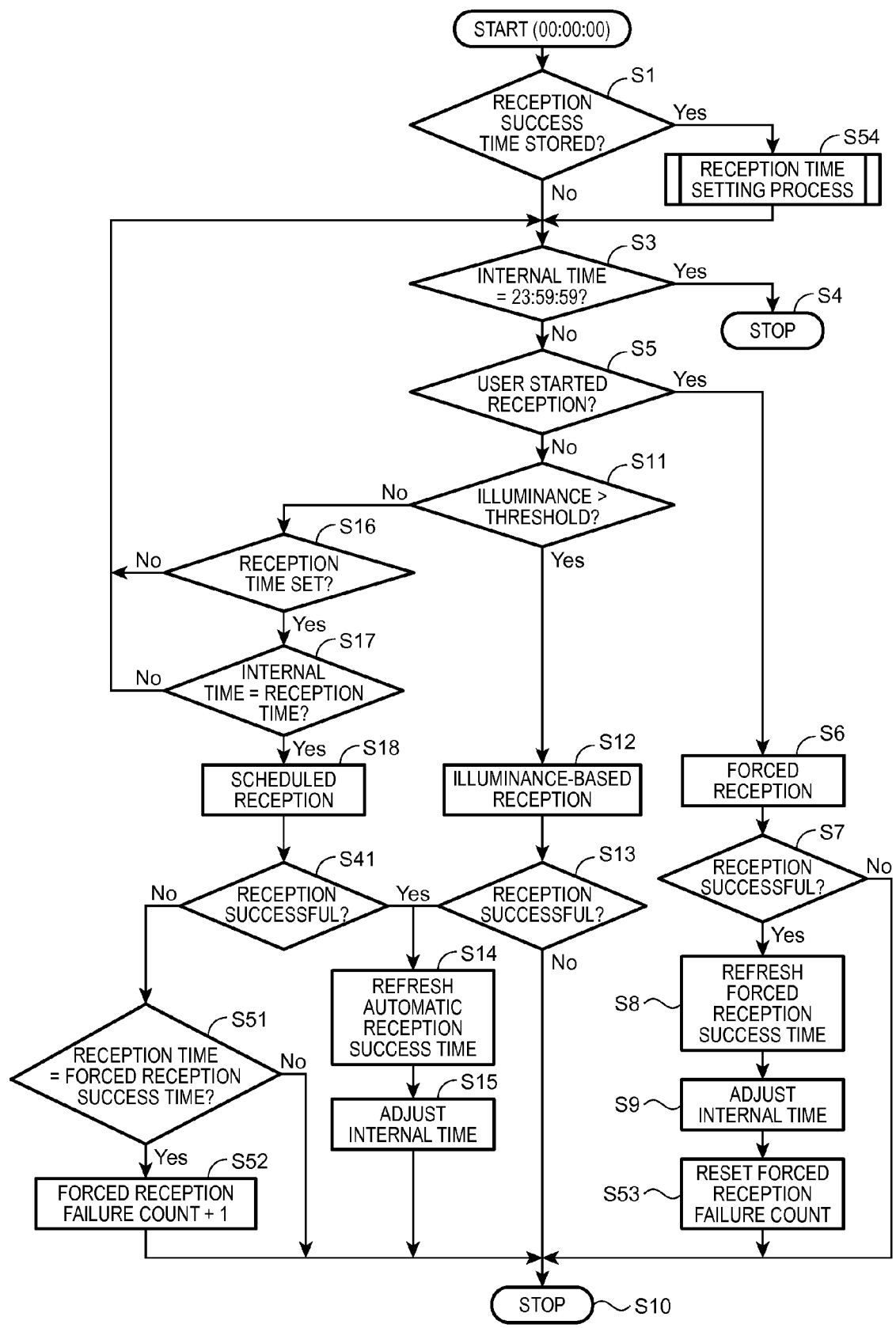
FIG. 10 is a flow chart of the reception control process in a fourth embodiment of the invention.
Figure 11:
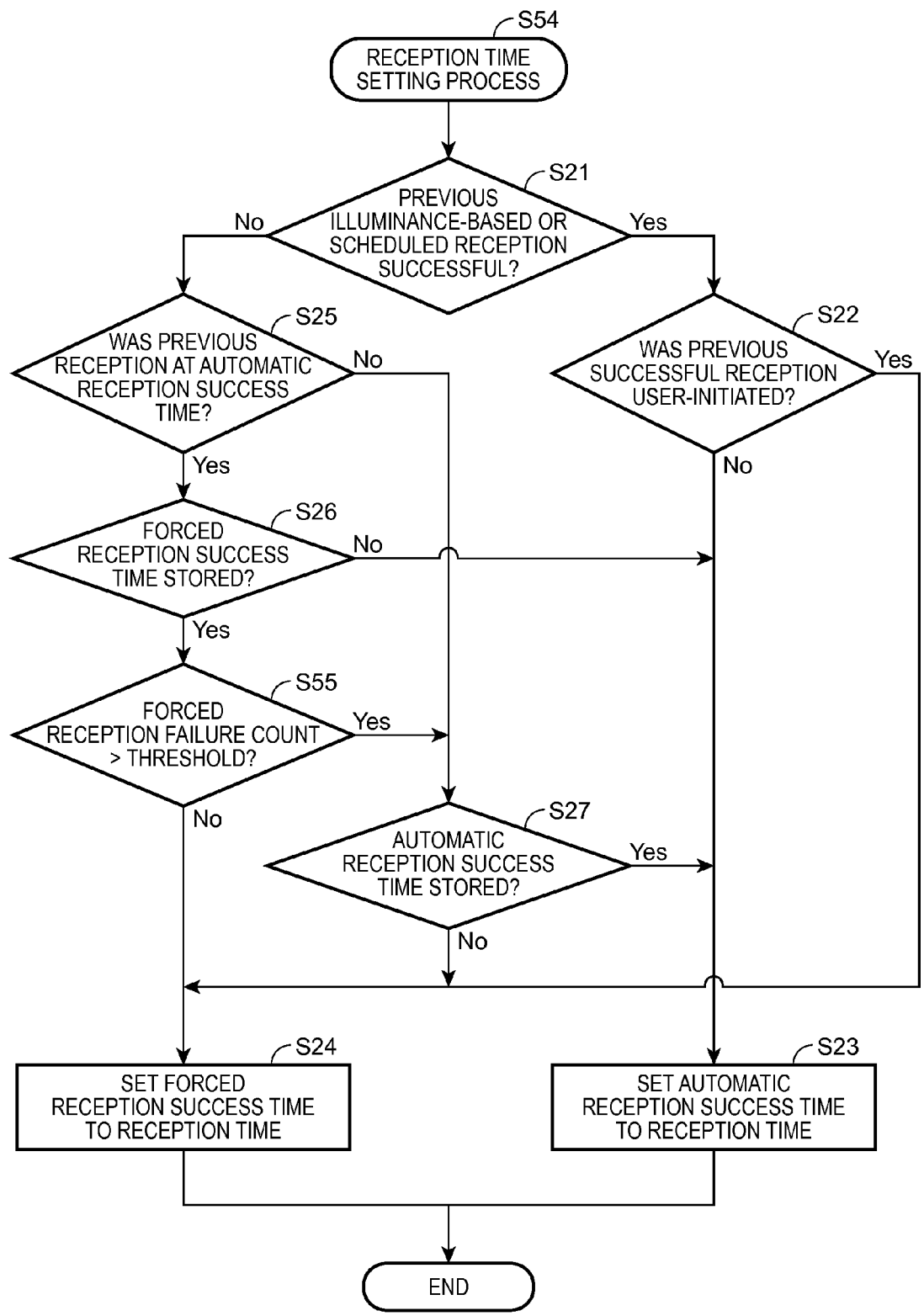
FIG. 11 is a flow chart of the reception time setting process in a fourth embodiment of the invention.

Identical steps in the flow charts in FIG. 10 and FIG. 11 and the flow charts in FIG. 5 and FIG. 6 of the first embodiment are identified by the same reference numerals, and further description thereof is omitted.

In the fourth embodiment as shown in FIG. 10, steps S1 and S3 to S18 are the same as in the first embodiment.

After the time-based automatic reception process S18, the scheduled reception control unit 72 determines if reception was successful (S41).

If reception was determined successful in S41, the automatic reception success time is updated as in the first embodiment (S14) and the internal time is adjusted (S15).

However, if reception was determined to have failed in S41, the reception control unit 70 determines if the reception time was set to the manual reception success time (S51).

Only if S51 returns Yes, the reception control unit 70 adds 1 to the manual reception failure count stored in storage unit 60 (S52).

If the manual reception process S6 results in successful reception (S7 returns Yes), steps S8 and S9 run as in the first embodiment, and the reception control unit 70 resets the manual reception failure count stored in the storage unit 60 to 0 (S53).

Reception Time Setting Process

The reception time setting process S54 that is executed when S1 returns Yes is described next with reference to FIG. 11.

The reception time setting process S54 includes steps S21 to S27 as in the reception time setting process S2 in the first embodiment. In addition, when S26 returns yes, the reception time setting unit 71 determines if the manual reception failure count stored in the storage unit 60 exceeds a preset threshold (S55). This threshold value is set desirably, and in this embodiment is set to 3.

If the threshold value is exceeded in S55, that is, if the time-based automatic reception process at the manual reception success time fails more than the specified number of times, the likelihood is high that the electronic timepiece 1 is not located outdoors or in another location suited to reception at the manual reception success time. In this case, the likelihood is also high that reception will fail again if the time-based automatic reception process is run at the same manual reception success time. Therefore, when S55 returns Yes, the reception time setting unit 71 checks if there is an automatic reception success time record (S27), and if there is, sets the automatic reception success time as the reception time (S23).

More specifically, when S26 returns Yes in the first embodiment, that is, when the reception time is set to the last automatic reception success time, the manual reception success time is set as the reception time (S24), but when automatic reception fails, the reception time switches alternately between the automatic reception success time and manual reception success time.

In this fourth embodiment, however, if the manual reception failure count is greater than the set threshold and the automatic reception success time is recorded, the automatic reception success time is set as the reception time (S23) even if S26 returns Yes, and the time-based automatic reception process run at the manual reception success time is cancelled until the manual reception process succeeds again and the manual reception failure count is reset in S53.

However, if there is no automatic reception success time record and only the manual reception success time is recorded, the manual reception success time is set as the reception time (S24).

Effect of the Fourth Embodiment

This fourth embodiment also has the same effect as the first embodiment.

This fourth embodiment stops the reception process at the manual reception success time if there is an automatic reception success time record when the reception process fails at the manual reception success time more than a specific number of times. As a result, the reception process will not be run needlessly and power can be saved when the user is not normally outdoors at the manual reception success time.

Because the reception process can be resumed at the manual reception success time after the manual reception process is successful again, interruption of the reception process can be easily cancelled by the user simply starting the manual reception process again when outdoors.

Other Embodiments

The invention is not limited to the foregoing embodiments, and can be varied in many ways without departing from the scope of the accompanying claims.

For example, the reception time setting unit 71 could set the reception time to a time a specific amount of time after the last reception process. For example, if this specific amount of time is 24 hours, the time-based automatic reception process will be executed every 24 hours if the illuminance-based automatic reception process or manual reception process are not executed. When the illuminance-based automatic reception process or manual reception process runs, the reception time is set to every 24 hours after the time of that reception process.

This specific amount of time is obviously not limited to 24 hours, and can be set according to the desired frequency of reception. In this case, the reception time setting unit 71 could detect the battery voltage, and change the specific time interval according to the battery voltage. For example, if the battery voltage is high and exceeds a specific threshold, the interval may be set to 24 hours, and may be gradually increased to 36 hours or 48 hours, for example, as the battery voltage drops.

When the scheduled reception control unit 72 is stopped for one day after the reception control process starts, the illuminance-based reception control unit 73 operates, but the illuminance-based automatic reception process of the illuminance-based reception control unit 73 does not execute any time during that day, both the scheduled reception control unit 72 and the illuminance-based reception control unit 73 could be operated from the next day so that the time-based automatic reception process also executes. If the illuminance-based automatic reception process is run by the illuminance-based reception control unit 73 before the reception time in this case, the scheduled reception control unit 72 can be stopped until the illuminance-based automatic reception process does not execute for a day.

By this giving priority to the illuminance-based reception control unit 73, the likelihood of reception occurring while outdoors can be increased, and the probability of successful reception can be improved.

The fourth embodiment counts the number of consecutive times reception fails and stops the reception process at the manual reception success time when a specific threshold is exceeded only when the reception time is set to the manual reception success time, but the number of consecutive times reception fails could also be counted when the reception time is set to the illuminance-based automatic reception time or the time-based automatic reception time to remove the time of repeated failure from the set reception times.

The time when reception fails repeatedly at the same time can be determined to be a time that is not suited to reception based on the user's daily schedule, and wasteful reception processes can be eliminated by preventing reception at that time.

An electronic device having a satellite signal reception device according to the invention is not limited to a wristwatch (electronic timepiece 1), and the invention can be used in a wide range of devices that are driven by a storage battery and receive satellite signals sent from positioning information satellites, including cellular phones and mobile GPS receivers used for mountain climbing, for example.

The entire disclosure of Japanese Patent Application No. 2011-187592, filed Aug. 30, 2011 is expressly incorporated by reference herein.

What is claimed is:

1. A timepiece, comprising:
a reception unit that receives a signal;
a timekeeping unit that keeps internal time;
a solar cell;

a voltage detection circuit that detects an illuminance of light incident to the solar cell; and a reception control unit that, every day when the time kept by the timekeeping unit reaches a predetermined time, determines whether a current date is a reception day or a no-reception day, and if the current date is a reception day then the reception control unit selectively executes an illuminance-based reception process that operates the reception unit when the illuminance detected by the voltage detection circuit equals or exceeds a set threshold, and if the current date is a no-reception day then the reception control unit does not execute the illuminance-based reception process.

2. The timepiece described in claim 1, further comprising:
a storage unit that stores a reception history;
wherein the reception control unit determines whether a current date is a no-reception day based on the stored reception history.

3. The timepiece described in claim 2, wherein:
the reception history includes information indicating whether a previous operation of the reception unit successfully received the signal.

4. The timepiece described in claim 1, wherein the reception control unit determines that the current date is the no-reception day if the reception unit was operated and successfully received the signal the immediately previous day.

5. The timepiece described in claim 1, wherein the reception control unit determines that the current date is the no-reception day if the reception unit was operated and successfully received the signal on a date that is a predetermined plurality of days immediately preceding the current date.

6. The timepiece described in claim 5, wherein the predetermined plurality of days is two days.

7. The timepiece described in claim 1, wherein the predetermined time is 00:00 AM.

8. The timepiece described in claim 1, further having a reception period comprised of a fixed plurality of consecutive days;
wherein within said reception period:
the first day in said reception period is a reception day;
if the reception unit is not operated in the first day in said reception period, then each subsequent day within the reception period is a reception day until reaching a day when the reception unit is operated; and
all days within the reception period following a day when the reception unit is operated are no-reception days;
wherein:
if the current day is a reception, then the reception control unit determines if the current day is the first day in said reception period or a later day in the reception period;
if the current day is the first day in said reception period, then the reception control unit schedules a reception time for the current day based on a first set of criteria; and
if the current day is not the first day in said reception period, then the reception unit schedules the reception time based on a second set of criteria different from the first set of criteria.

9. The timepiece described in claim 8, wherein:
if the current day is the first day in said reception period, then the reception control unit schedules a reception time to an automatic operation time if an automatic operation time is previously stored, otherwise the control unit schedules the reception time to a time matching a most-immediately preceding manually-initiated reception operation.

10. The timepiece described in claim 9, wherein:
if the current day is not the first day in said reception period, then the reception control unit determines if the immediately previous operation of the reception unit was due to a manual trigger or an automated trigger, and
if the previous operation was due to a manual trigger, then the reception control unit schedules the reception time to an automatic operation time if an automatic operation time is stored, and
if the previous operation was due to an automated trigger, then the reception control unit schedules the reception time to a time matching a most-immediately preceding manually-initiated reception operation.

11. The timepiece described in claim 1, wherein the signal is a satellite signal that comprises time information.

12. A timepiece, comprising:
a reception unit that receives a signal;
a timekeeping unit that keeps internal time; and
a reception control unit that determines every day whether a current date is a reception day or a no-reception day, and if the current date is a reception day then the reception control unit executes a time-based reception process that determines whether the time kept by the timekeeping unit reaches a reception time and operates the reception unit when the time kept by the timekeeping unit reaches the reception time, and if the current date is a no-reception day then the reception control unit does not execute the time-based reception process.

13. The timepiece described in claim 12, further comprising:
a storage unit that stores a reception history;
wherein the reception control unit determines whether a current date is a no-reception day based on the stored reception history.

14. The timepiece described in claim 13, wherein:
the reception history includes information indicating whether a previous reception operation successfully received the signal.

15. The timepiece described in claim 12, wherein
the reception control unit determines the current date is the no-reception day when the reception which is executed the previous day succeeds.

16. The timepiece described in claim 12, wherein the reception control unit determines that the current date is the no-reception day if the reception unit was operated and successfully received the signal within the previous two days.

17. The timepiece described in claim 12, wherein the predetermined time is 00:00 AM.

18. The timepiece described in claim 12, wherein the signal is a satellite signal that comprises time information.

* * * * *